July 5, 1960

C. J. HOLTKAMP 2,944,135

CONTROL FOR FLASHING ELECTRIC HEATERS

Filed Jan. 23, 1959

INVENTOR
CALVIN J. HOLTKAMP

BY
Ralph T. French
ATTORNEY

United States Patent Office 2,944,135
Patented July 5, 1960

2,944,135

CONTROL FOR FLASHING ELECTRIC HEATERS

Calvin J. Holtkamp, Mansfield, Ohio, assignor to Westinghouse Electric Corporation, East Pittsburgh, Pa., a corporation of Pennsylvania Filed Jan. 23, 1959, Ser. No. 788,630

8 Claims. (Cl. 219—20)

This application is a continuation-in-part of my copending application Serial No. 709,499, filed January 17, 1958 and now abandoned.

This invention relates to a control for an electrical resistance heater and more particularly to switching mechanism for initially connecting such heater to effect flashing or abnormally high energization thereof for a limited period and thereafter controlling its average wattage output at a lower level.

The term "flashing" is commonly used in connection with electric heaters to denote a condition in which a heating element is over-energized to provide an abnormally high wattage input that cannot be tolerated for an indefinite period without damaging the heater. Such abnormally high energization may be tolerated for a short controlled period of time to rapidly bring the heater up to approximately the temperature at which it may be operated continuously, and thereafter the heater may be controlled at a lower level of energization to provide continued normal heating.

Today many domestic electric ranges have surface heating units provided with automatic controls. Many of these controls do not include any mechanism for producing flashing. Consequently it is desirable to have a flashing control that can be combined with existing automatic controls without requiring expensive modifications of the latter. Different manufacturers of electric ranges use automatic controls of various types or designs, and any one manufacturer may use automatic controls of different types on different years' models. Consequently it is desirable to have a flashing control that may be easily adapted to a number of types of automatic controls. The present invention provides such a universal flash control.

In accordance with the present invention a pivoted transfer switch is movable between a first position where it passes an abnormally high wattage input to the heater to be flashed, and a second position when it passes a normal wattage to the heater. While the transfer switch is in the second position, the normal wattage is controlled by the automatic control, which may be any one of several known types. The transfer switch includes a resistance heater whose temperature rise is directly related to the temperature rise of the heater being flashed. A bimetal in the transfer switch is heated by the resistance heater and upon reaching a predetermined temperature functions to move the transfer switch from its first position to interrupt the flashing circuit. Suitable means then biases the transfer switch to its second position to establish the normal wattage circuit which is regulated by the automatic control.

Figure 1:
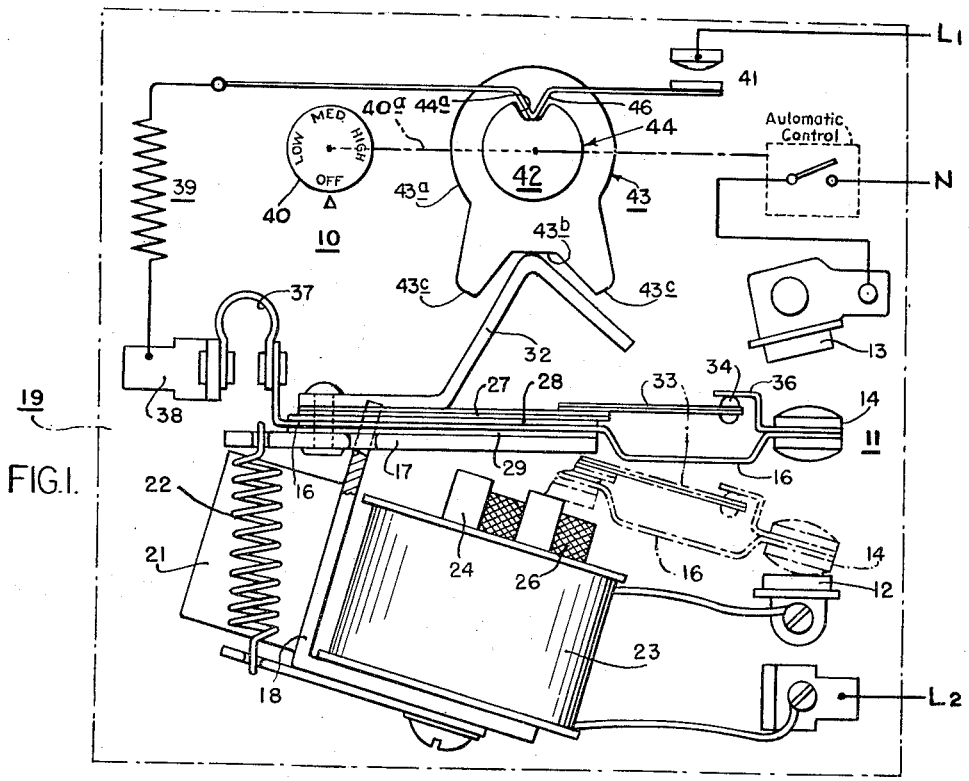
Fig. 1 is an elevational view of a flashing control constructed in accordance with the present invention.

Referring in greater detail to Fig. 1, there is shown a flashing control 10 including a transfer switch 11 having a pair of spaced relatively stationary contacts 12 and 13 and a contact 14 therebetween movable into engagement with each stationary contact, separately. The intermediate movable contact 14 is supported by a resilient electrically-conductive metallic heating strip 16 carried by a magnetic armature 17 which is pivotally mounted on an L-shaped magnetic bracket 18 fixed to suitable base structure 19 by mounting flange 21. The armature 17 is biased counterclockwise (as viewed in Fig. 1) by a tension spring 22 and constitutes part of the magnetic circuit of an alternating current electromagnet 23. The electromagnet 23 may include a conventional magnetic core 24 and a shading coil 26. The winding of the electromagnet is connected at one end to the stationary contact 12 and at its other end to a line conductor terminal L2.

The armature 17 carries a bimetal 27 in overlying relation to the resilient metal strip 16 (which strip functions as a resistance heating element), but spaced from the latter by an insulating strip 28. A similar insulating strip 29 separates the metal strip or heating element 16 from the armature, and a rivet retains the armature, the resistance heating element, the bimetal and the two insulators in stacked relation. A resilient wire is also retained by the rivet and provides a cam follower 32 for a purpose to be explained later.

A compensating bimetal 33 is carried by the free end portion of the main bimetal 27 and has at its free end an insulator 34 for engagement, under certain operating conditions, with an adjustable stop 36 carried by the intermediate movable contact 14. Adjustment of stop 36 is effected by bending said stop toward or away from the compensating bimetal 33 and its insulator 34.

That end of the resistance heating element 16 which is remote from the movable contact 14 is electrically connected, as at 37, to a terminal 38, and through the latter is in series with an electric heater 39 to be flashed. The heater 39 is connected, through a simple on-off switch 41, with a line conductor L1 of a power source.

A cam member 42, manually operable by a control knob 40, is provided with a pair of cam surfaces 43 and 44 for positioning switches 11 and 41, respectively. Cam surface 44 is cylindrical with respect to its axis of rotation, except for a depression at 44a. When the cam member 42 is in the "off" position or station, the follower 46 of switch 41 is received in the cam depression 44a, thereby opening the switch 41 and interrupting flow of current from conductor L1. When the follower 46 is out of the depression 44a and contacting the cylindrical surface 44, the switch 41 is closed and the control is in an "active" position or station.

The cam surface 43 includes a low or "active" portion 43a, an intermediate or "off" portion 43b and a pair of high portions 43c at opposite sides of the intermediate portion 43b. When the cam member 42 is in the "off" station, the follower 32 of the transfer switch 11 engages the cam surface intermediate portion 43b, thereby positioning the movable contact 14 of the transfer switch 11 intermediate its stationary contacts 12 and 13 against the biasing effect of the spring 22.

The stationary contact 13 of the transfer switch 11 is connected with the neutral conductor N of the power source through any one of several known types of automatic controls. By way of illustration only, such automatic control might be a wattage control, for example, of the thermally operated cycling type, or a temperature responsive control, for example, one responsive to the temperature of a vessel placed on the heater to be flashed.

The automatic control would include a manually operable control knob 40, having an inactive or off station in which the automatic control interrupts flow of current to the heater 39, and a plurality of active stations in which the automatic control provides normal energization of the heater in accordance with the selected setting of the control knob.

The cam 42 of the flashing control herein disclosed preferably is mounted on the shaft 40a of the automatic control and hence is adjusted simultaneously with the automatic control upon manual adjustment of the control knob 40. The cam 42 is so disposed on the shaft 40a that its inactive station (shown in Fig. 1) coincides with the inactive station of the automatic control and of the control knob 40, and its active stations (surface 43a) similarly coincide with the active stations of the automatic control and of the control knob 40.

In operation of the control, the user manually turns the cam member 42, through the control knob 40, from the "off" station (surface 43b) illustrated in Fig. 1 in either direction to an active station (surface 43a). This movement of the cam member lifts the follower 46 of the switch 41 from the depression 44a to the cylindrical surface 44, thereby closing the switch 41. At the same time, one of the high surfaces 43c of the cam member acts upon the follower 32 of the transfer switch 11 to move the movable contact 14 into engagement with the stationary contact 12, thereby establishing an electrical circuit from L1, through electrical heater 39, resistance heating element 16, contacts 14 and 12 and the electromagnet 23 to terminal L2, and imposing an abnormally high wattage on the electrical heater 39 and the resistance heating element 16 to flash the former and to heat the latter to change the temperature of the bimetal 27. Establishment of this circuit causes the electromagnet 23 to held the armature 17 in contact with the electromagnet core 24.

The main bimetal 27 and the compensating bimetal 33 are so designed that at the time the electrical heater 39 has flashed to the desired operating temperature, the combined movements of the bimetals will operate through the adjustable stop 36 to lift the movable contact 14 out of engagement with the stationary contact 12 by flexing the free end portion of the resistance heater strip 16, whereupon the electromagnet 23 is deenergized and no longer holds the armature, and the tension spring 22 becomes effective to pivot the armature 17 and its associated elements counterclockwise, as viewed in Fig. 1, causing the contact 14 to engage stationary contact 13 and establish a normal wattage circuit to neutral via the automatic control. Thereafter, the automatic control will regulate the supply of current to the heater 39, for all active stations of the manually adjustable control knob 40.

An important feature of the present invention is the "thermal matching" of the heater 39 and the bimetal 27. In most cases the heater 39 is of the sheathed type, comprising a wire or rod through which the electric current is passed to provide the heat source and which is positioned in a tubular sheath in spaced relation to the walls of the latter, with the space between the heater wire or rod and the tubular sheath filled with an insulating material, such as magnesium oxide or the equivalent.

In the transfer switch 11, the resistance heating element 16 corresponds to the electrically-heated wire or rod of the sheathed heater, the bimetal 27 corresponds to the tubular sheath, and the insulating strip 28 corresponds to the insulation. These three elements 16, 27 and 28 are so designed as regards their materials and thicknesses that the bimetal 27 will have the same rate of heating and cooling as the heater 39, particularly the sheath thereof when a sheathed-type heater is utilized.

This "thermal matching," together with the arrangement of the heater and bimetal in the same circuit at all times, insures that the temperature of the bimetal is always proportional to the temperature of the heater. Consequently, the flashing circuit will not stay closed too long, so as to result in overheating of the heater in the event of repeated flashing or flashing after the heater has operated on a high setting for an extended period.

It will be apparent that by omitting one of the cam member high portions 43c, the initial flashing of the heater 39 may be omitted by the user, if desired. In such an arrangement, turning of the cam member in one direction from the inactive station will produce flashing, while turning the cam member in the opposite direction from the inactive station will result in normal heating, without flashing.

Figure 2:
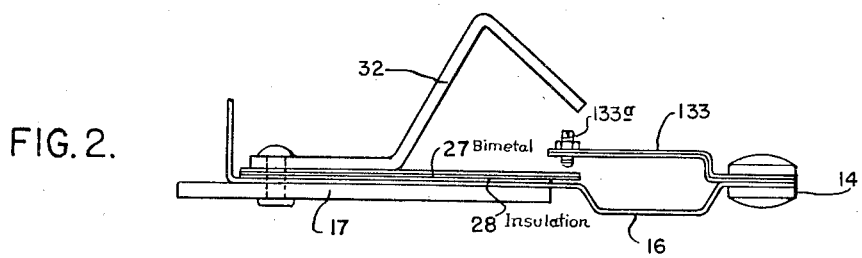
Fig. 2 is an elevational view of a modified transfer switch construction.

Referring to Fig. 2, the armature, resistance heating element and bimetal assembly therein illustrated differs from that described above in connection with Fig. 1 in that the compensating bimetal 133 is supported by the contact 14 and carries an adjustment screw 133a at its free end for contact by the free end of the main bimetal 27 when the latter moves upwardly due to heating by the resistance heating element 27.

Figure 3:
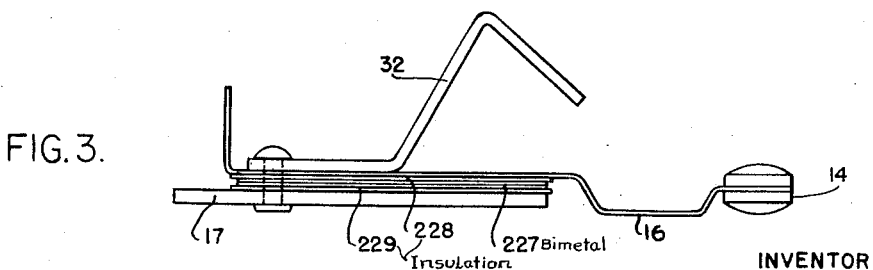
Fig. 3 is an elevational view of a further modified transfer switch.

In Fig. 3, the compensating bimetal of the two previously-described constructions is omitted, and the bimetal 227 is positioned between the armature 17 and the resistance heating element 16. The bimetal 227 is separated from the heating element and the armature by insulators 228 and 229, respectively, and its deflection upon heating lifts the heating element 16, thereby separating the contact 14 from the contact 12.

While the invention has been shown in several forms, it will be obvious to those skilled in the art that it is not so limited, but is susceptible of various other changes and modifications without departing from the spirit thereof.

What is claimed is:

1. A control for flashing an electrical heater having relatively high and low voltage power sources; comprising a transfer switch having first and second spaced relatively stationary contacts for connection, respectively, to high and low voltage power sources, a third contact supported for movement between a flashing position in engagement with the first contact and a low voltage position in engagement with the second contact, manually operable cam means movable from "off" position to any one of a plurality of active positions, said cam means having a portion cooperating with said transfer switch to actuate said movable contact to its flashing position during movement of said cam means from its "off" position to an active position, electromagnetic means in series with said first contact for holding said movable contact in its flashing position, means urging said movable contact to its low voltage position, and means carried by said transfer switch for moving said movable contact out of engagement with said first contact when the electrical heater has flashed to the desired operating temperature, whereupon said electromagnetic means is deenergized and said urging means is effective to move said movable contact to its low voltage position.

2. A control for flashing an electrical heater having relatively high and low voltage power sources comprising a transfer switch having high and low voltage spaced relatively stationary contacts for connection, respectively, to the high and low voltage power sources, a third contact supported for movement between a high voltage position in engagement with the high voltage contact and a low voltage position in engagement with the low voltage contact, means for connecting said movable contact in series with the electrical heater to be flashed, electromagnetic means in series with said high voltage contact for holding said movable contact in its high voltage position, manually operable cam means movable from an "off" position where the movable contact is intermediate its high and low voltage positions to any one of a plurality of active positions, said cam means having a portion cooperating with said transfer switch to actuate said movable contact to said high voltage position during movement of said cam means from its "off" position to an active position, thereby energizing the electromagnetic means, means urging said movable contact to its low voltage position, and means carried by said transfer switch for moving said movable contact out of engagement with said high voltage contact when the electrical heater has flashed to the desired operating temperature, thereby deenergizing said electromagnetic means and rendering said urging means effective to move said movable contact to its low voltage position.

3. A control for flashing an electrical heater having relatively high and low voltage power sources comprising a transfer switch having first and second spaced relatively stationary contacts for connection, respectively, to the high and low voltage power sources, a movable contact supported for movement between a first position in engagement with the first contact and a second position in engagement with the second contact, means connecting said movable contact in series with the electrical heater to be flashed, manually operable cam means movable from an "off" position where the movable contact is intermediate its first and second positions to any one of a plurality of active positions, said cam means having a portion cooperating with said transfer switch to actuate said movable contact to said first position during movement of said cam means from its "off" position to any active position, electromagnetic means in series with said first contact for holding said movable contact in its first position, means urging said movable contact to its said second position, and thermostatic means carried by said transfer switch for moving said movable contact out of engagement with said first contact when the electrical heater has flashed to the desired operating temperature, thereby deenergizing the electromagnetic means and rendering said urging means effective to move said movable contact to its second position.

4. A control for flashing an electrical heater having relatively high and low voltage power sources comprising a transfer switch having first and second spaced relatively stationary contacts for connection, respectively, to high and low voltage power sources, a movable contact supported for movement between a high voltage position in engagement with the first contact and a low voltage position in engagement with the second contact, means including a resistance heating element connecting said movable contact in series with the electrical heater to be flashed, electromagnetic means in series with said first contact for holding said movable contact in its high voltage position, manually operable cam means movable from an "off" position to any of a plurality of active positions, said cam means having a portion cooperating with said transfer switch to actuate said movable contact to its high voltage position during movement of said cam means from its "off" position to an active position, means urging said movable contact to its low voltage position, and bimetallic means carried by said transfer switch and responsive to increase in temperature of the resistance heating element to a predetermined value for moving said movable contact out of engagement with said first contact when the electrical heater has flashed to the desired operating temperature, thereby deenergizing the electromagnetic means and rendering said urging means effective to move said movable contact to its low voltage position.

5. A control for flashing an electrical heater having relatively high and low voltage power sources, comprising a transfer switch having first and second spaced relatively stationary contacts for connection, respectively, to high and low voltage power sources, a movable contact supported for movement between a high voltage position where it is in engagement with the first contact and out of engagement with the second contact and a low voltage position where it is in engagement with the second contact and out of engagement with the first contact, means including a resistance heating element connecting said movable contact in series with the electrical heater to be flashed, an armature carrying said movable contact, a coil in series with the first contact and adapted to be energized upon movement of said movable contact to its high voltage position for holding said armature and retaining said movable contact carried by the armature in its high voltage position, manually operable means movable from an "off" position where said movable contact is intermediate its high and low voltage positions to any of a plurality of active positions, said last-mentioned means having a portion cooperating with said transfer switch to actuate said movable contact into its high voltage position during movement of said last-mentioned means from its "off" position to an active position, bimetallic means carried by the transfer switch and so positioned with respect to the resistance heating element as to be heated by the latter to a temperature rendering it effective to move said movable contact out of engagement with said first contact, thereby deenergizing the coil, and means effective upon deenergization of said coil for moving said movable contact to its low voltage position.

6. A control for flashing an electrical heater having relatively high and low voltage power sources; comprising a transfer switch having first and second spaced relatively stationary contacts for connection, respectively, to high and low voltage power sources; a contact structure supported for movement between a first position where it is in engagement with the first contact and out of engagement with the second contact and a second position where it is in engagement with the second contact and out of engagement with the first contact, said contact structure including a resilient metal strip connected in series with the electrical heater to be flashed and including a portion constituting a resistance heating element, a third contact carried by said strip, a bimetal positioned to be heated by the resistance heating element, an armature supporting said strip, said bimetal being effective when heated to a predetermined temperature to deflect said metal strip and move said third contact relative to the armature; a coil in series with the first contact and adapted to be energized upon movement of said contact structure to its first position for attracting said armature and thus holding said contact structure carried by the armature in its said first position; manually operable means movable from an "off" position to any one of a plurality of active positions, said last-mentioned means having a portion cooperating with said transfer switch to actuate the armature into engagement with the coil and said contact structure into its first position during movement of said last-mentioned means from its "off" position to an active position, whereby a circuit is established through the electrical heater, the metal strip including its resistance heating element portion, said third contact, the first contact and the coil, thereby effecting flashing of the electrical heater, energization of the coil, and heating of the bimetal by the resistance heating element, the heating of the bimetal producing movement of the third contact relative to the armature to open the circuit and deenergize the coil; and means effective upon deenergization of said coil for moving said contact structure to its second position.

7. A control for flashing an electrical heater having relatively high and low voltage power sources, comprising a transfer switch having first and second spaced relatively stationary contacts for connection, respectively, to high and low voltage power sources, a third contact supported for movement between a high voltage position where it is in engagement with the first contact and out of engagement with the second contact and a low voltage position where it is in engagement with the second contact and out of engagement with the first contact, means including a resistance heating element connecting the movable contact in series with the electrical heater to be flashed, an armature carrying said movable contact, a coil in series with the first contact and adapted to be energized upon movement of said movable contact to its first position for attracting said armature and thus holding said movable contact carried by the armature in its said high voltage position, means movable from an "off" position where said movable contact is intermediate its high and low voltage positions to any one of a plurality of active positions, said last-mentioned means having a portion cooperating with said transfer switch to actuate the armature into engagement with the coil and said movable contact into its high voltage position during movement of said last-mentioned means from its "off" position to an active position, bimetallic means carried by the transfer switch including a main bimetal so positioned with respect to the resistance heating element as to be heated by the latter to a temperature rendering it effective to move said movable contact out of engagement with said first contact and a compensating bimetal effective to modify the effect of the main bimetal in response to ambient temperature, such movement of the movable contact out of engagement with the first contact deenergizing the coil, and means effective upon deenergization of said coil for moving said movable contact to its low voltage position.

8. A control for flashing an electrical heater having relatively high and low voltage power sources, comprising a transfer switch having first and second spaced relatively stationary contacts for connection, respectively, to high and low voltage power sources, a third contact supported for movement between a high voltage position where it is in engagement with the first contact and out of engagement with the second contact and a low voltage position where it is in engagement with the second contact and out of engagement with the first contact, means including a resistance heating element connecting the movable contact in series with the electrical heater to be flashed, an armature carrying said movable contact, a coil in series with the first contact and adapted to be energized upon movement of said movable contact to its high voltage position for attracting said armature and thus holding said movable contact carried by the armature in its said high voltage position, manually operable means movable from an "off" position where said movable contact is intermediate its high and low voltage positions to any one of a plurality of active positions, said last-mentioned means having a portion cooperating with said transfer switch to actuate the armature into engagement with the coil and said movable contact into its high voltage position during movement of said last-mentioned means from its "off" position to any active position, bimetallic means carried by the transfer switch and so positioned with respect to the resistance heating element as to be heated by the latter to a temperature rendering it effective to move said movable contact out of engagement with said first contact, thereby deenergizing the coil, means effective upon deenergization of said coil for moving said movable contact to its low voltage position, and regulating means between the second contact and the low voltage power source with which it is adapted for connection for controlling the electrical heater in accordance with all selected active positions of the manually operable means while the movable contact is in its low voltage position.

References Cited in the file of this patent

UNITED STATES PATENTS

| | | |
|---|---|---|
| 2,567,188 | Davis | Sept. 11, 1951 |
| 2,591,849 | McDowell | Apr. 8, 1952 |
| 2,632,085 | Brosseau | Mar. 17, 1953 |
| 2,798,929 | Wojcik | July 9, 1957 |
| 2,813,172 | Wojcik | Nov. 12, 1957 |